United States Patent [19]

Braun et al.

[11] 3,758,860

[45] Sept. 11, 1973

[54] SELECTIVE CALLING SQUELCH CIRCUIT FOR RECEIVING SYSTEMS

[75] Inventors: William V. Braun, Chicago; Daniel P. Brown, Elmhurst; Albert J. Leitich, Chicago, all of Ill.

[73] Assignee: Motorola, Inc., Franklin Park, Ill.

[22] Filed: Jan. 17, 1972

[21] Appl. No.: 218,107

[52] U.S. Cl. .......................... 325/18, 325/55, 325/64

[51] Int. Cl. .......................... H04b 7/38

[58] Field of Search .......................... 325/18, 55, 64; 179/1 SW; 340/171 R, 171 PF

[56] References Cited

UNITED STATES PATENTS

| | | | |
|---|---|---|---|
| 3,496,467 | 2/1970 | Lundgren | 325/64 X |
| 3,613,003 | 10/1971 | Kubo et al. | 325/18 |

*Primary Examiner*—Benedict V. Safourek

*Attorney*—Vincent J. Rauner, Eugene A. Parsons et al

[57] ABSTRACT

A receiver, decoder and switch connected to an (audio) output stage with a first band pass filter connected to the decoder and supplying a signal to an OR gate only when a message is properly decoded by the decoder and a second band pass filter connected to the decoder and supplying a signal to the OR gate only when white noise, or an improperly decoded signal, is present at the decoder. The presence of a signal from the first filter or the absence of a signal from the second filter enables the OR gate and activates the switch to allow the signal to pass from the decoder to the output stage.

10 Claims, 3 Drawing Figures

PATENTED SEP 11 1973

3,758,860

SHEET 1 OF 2

SELECTIVE CALLING SQUELCH CIRCUIT FOR RECEIVING SYSTEMS

BACKGROUND OF THE INVENTION

1. Field of the Invention

The present squelch circuit pertains to receivers in general, and more specifically to receivers utilized in paging systems and the like where a plurality of receivers may be tuned to receive a common channel or band of frequencies. So that each receiver does not receive messages intended for other receivers, the messages are coded by the transmitters so that they can only be received by specific receivers with the properly arranged decoding device therein. It is generally an inherent characteristic of the coded signals that any receiver not having the proper decoding circuitry therein will produce a signal closely resembling random white noise. Because this random white noise is objectionable, it is desirable to incorporate a selective calling squelch circuit in the receiver to disconnect the audio or output stages from the receiver except during the reception of properly decoded signals.

2. Description of the Prior Art

In the prior art, a great variety of squelch circuits have been designed, only some of which include noise ratio controlled squelch circuits, tone coded squelch circuits, carrier activated squelch circuits, etc. A great many of these squelch circuits prevent inter-channel noise, that is receiver noise which is present when a carrier is not present, but do not operate when an improperly coded message is present. Further, many of these squelch circuits have a tendency to operate during pauses or breaks in the formation and, because of slow turn-on time, may in many instances squelch some of the information. In addition, many of the prior art squelch circuits are extremely complicated and expensive.

SUMMARY OF THE INVENTION

The present invention pertains to a system, including a selective calling squelch circuit, for receiving transmitted signals including information, having a specified band of frequencies, coded to produce a relatively wide band of frequencies with an average amplitude across the band which differs substantially from the average amplitude across the band of the information, including a receiver having a decoder attached thereto and switch means attached to the decoder for passing the information to an output of the switch upon the activation thereof. First band pass filter means are attached to the output of the decoder for passing correctly decoded information to a gate means and second band pass filter means are connected to the output of the decoder and to the gate means for passing a band of white noise to the gate means when the signal from the receiver is not properly decoded. The output of the gate means is utilized to activate the switch means when a correctly decoded signal is passed by the first filter means or when no signal is present at the output of the second filter means.

It is an object of the present invention to provide an improved selective calling squelch circuit for receiving systems.

It is a further object of the present invention to provide an improved selective calling squelch circuit which maintains the receiving system in an active state throughout correctly coded transmissions, and even during pauses therein.

It is a further object of the present invention to provide an improved selective calling squelch circuit which is relatively simple and inexpensive to construct.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the Figures.

DESCRIPTION OF THE PREFERRED EMBODIMENT

Figure 1:
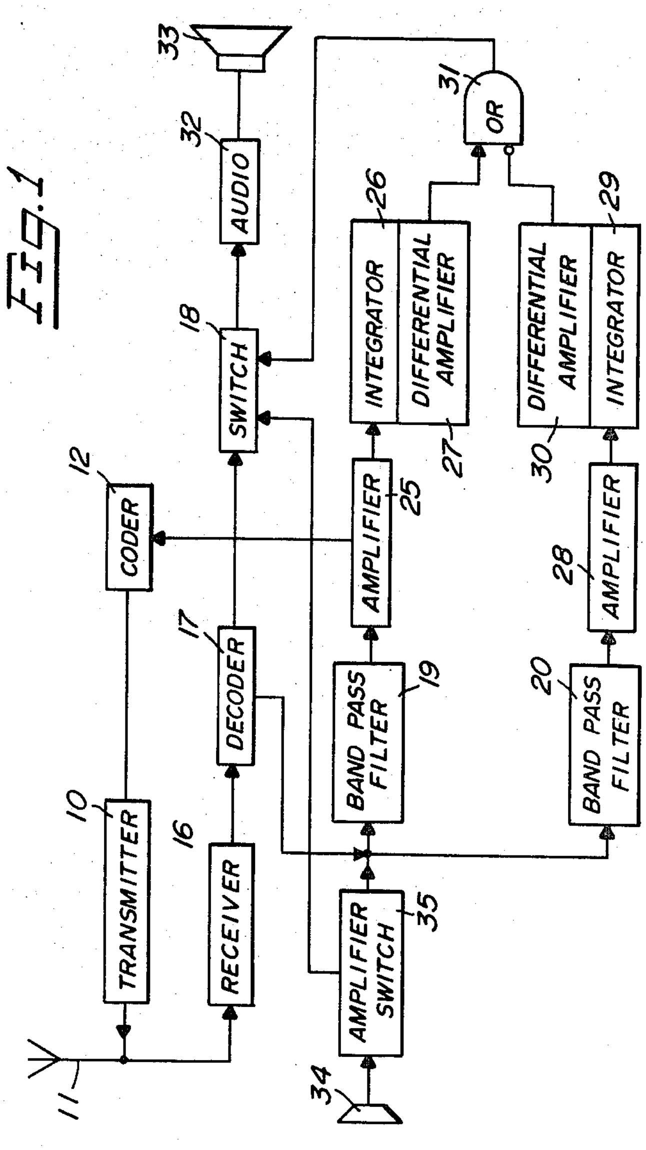
FIG. 1 is a block diagram of the present system including an improved selective calling squelch circuit.

Referring more specifically to FIG. 1, the numeral 10 designates a transmitter having an antenna 11 connected to the output thereof. A coder 12, which in the present embodiment includes a Delta modulator and scrambler having therein shift register/exclusive or circuitry is connected to an input of the transmitter 10. The Delta modulator of the coder 12 converts information, such as audio signals, to digital signals and the scrambler mixes the digital signals in a predetermined manner (generally with a predetermined digital coding signal, or key, having a frequency spectrum similar to white noise over a specific bandwidth) to provide the coded signal with a relatively wide band of frequencies, a typical example of which is graphically depicted by the line 15 in FIG. 2.

A receiver 16 has an input connected to the antenna 11 for receiving signals transmitted by a remote transmitter (not shown). The output of the receiver is supplied to a decoder 17, which is similar to the coder 12 but operates in a reverse direction to unscramble and convert the digital signals to the desired information, such as audio signals. If the signals received by the receiver 16 and applied to the decoder 17 are scrambled in accordance with a procedure preset into decoder 17, the decoder 17 will supply decoded information at the outputs thereof. However, if the signals received are coded in accordance with a different procedure or schedule they will not be properly decoded and white noise having a relatively wide band of frequencies will be present at the outputs of the decoder 17. While the present system is illustrated in combination with a transmitter and receiver utilizing audio input and output, it should be understood that the present system might be utilized with substantially any range of frequencies and any type of transmitter and receiver.

The output of the decoder 17 is applied to an input of a switch 18 and to inputs of a first band pass filter 19 and a second band pass filter 20. In the present embodiment the first band pass filter 19 is an audio filter designed to pass a band of frequencies between 350 and 2,700 hertz and the second band pass filter is a subaudio filter designed to pass a band of frequencies between 50 and 150 hertz. The signal applied to the filters 19 and 20, if properly decoded by the decoder 17, lies substantially completely within the frequency band of the filter 19, because of frequency limiting in the remote transmitter. If the received signals are not properly decoded, the output of the decoder will appear to be random white noise covering a band of frequencies from 0 to approximately 30 KHz, which includes the bands of frequencies of both filters 19 and 20 as illustrated in FIG. 2.

Figure 2:
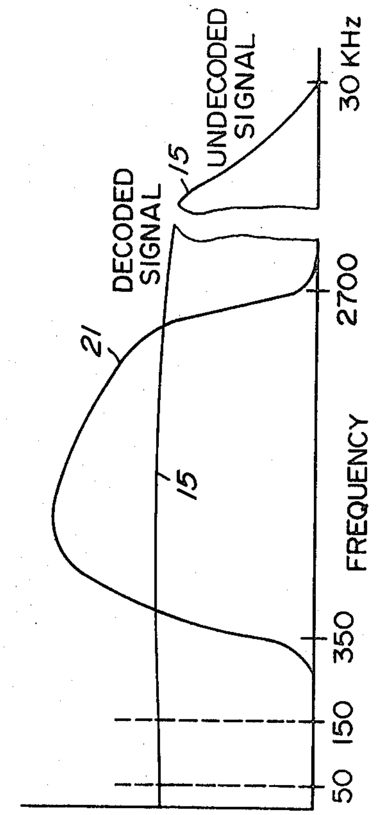
FIG. 2 is a view illustrating representative bands of frequencies for the system of FIG. 1.

Because substantially all of the transmitted power from the remote transmitter is contained within the band of frequencies of the filter 19, in a correctly decoded signal, the amplitude across the band will be substantially higher than the amplitude across the band of the incorrectly decoded signal as illustrated by the graphic representation 21 in FIG. 2. Thus, the output of the band pass filter 19 will be relatively high when correctly decoded signals are applied thereto and the output of the band pass filter 20 will be 0 when correctly decoded signals are applied thereto, but the outputs will be approximately equal and midway between the high and 0 when an incorrectly decoded signal is applied thereto. It should be noted that the present system will operate with some relatively minor circuit changes, if the average amplitudes of the correctly and incorrectly decoded signals differ and it is not essential that the correctly decoded signal be higher than the incorrectly decoded signal.

The output of the band pass filter 19 is applied to an amplifier 25 an output of which is applied to the input of the coder 12 during transmission and an output of which is applied to an integrator 26-differential amplifier 27 during reception. In a similar fashion the output of the band pass filter 20 is applied to an amplifier 28 the output of which is applied to an integrator 29-differential amplifier 30. The output of the differential amplifier 27 is applied to an input of an OR gate 31 and an inverse output of the differential amplifier 30 is applied to a second input of the OR gate 31. The output of the OR gate 31 is utilized to enable the switch 18 to pass signals applied to the input thereof to a signal utilizing means, such as audio output 32 and transducer 33. During transmission, a microphone 34 applies signals to an amplifier-switch 35 which applies a deactivating signal to the switch 18 and supplies the information to be transmitted to the band pass filter 19. The band pass filter 19 frequency limits the information before it is applied to the coder 12 by way of the amplifier 25 so that the information (and transmitter power) is contained substantially completely within the band of frequencies passed by filter 19.

Figure 3:
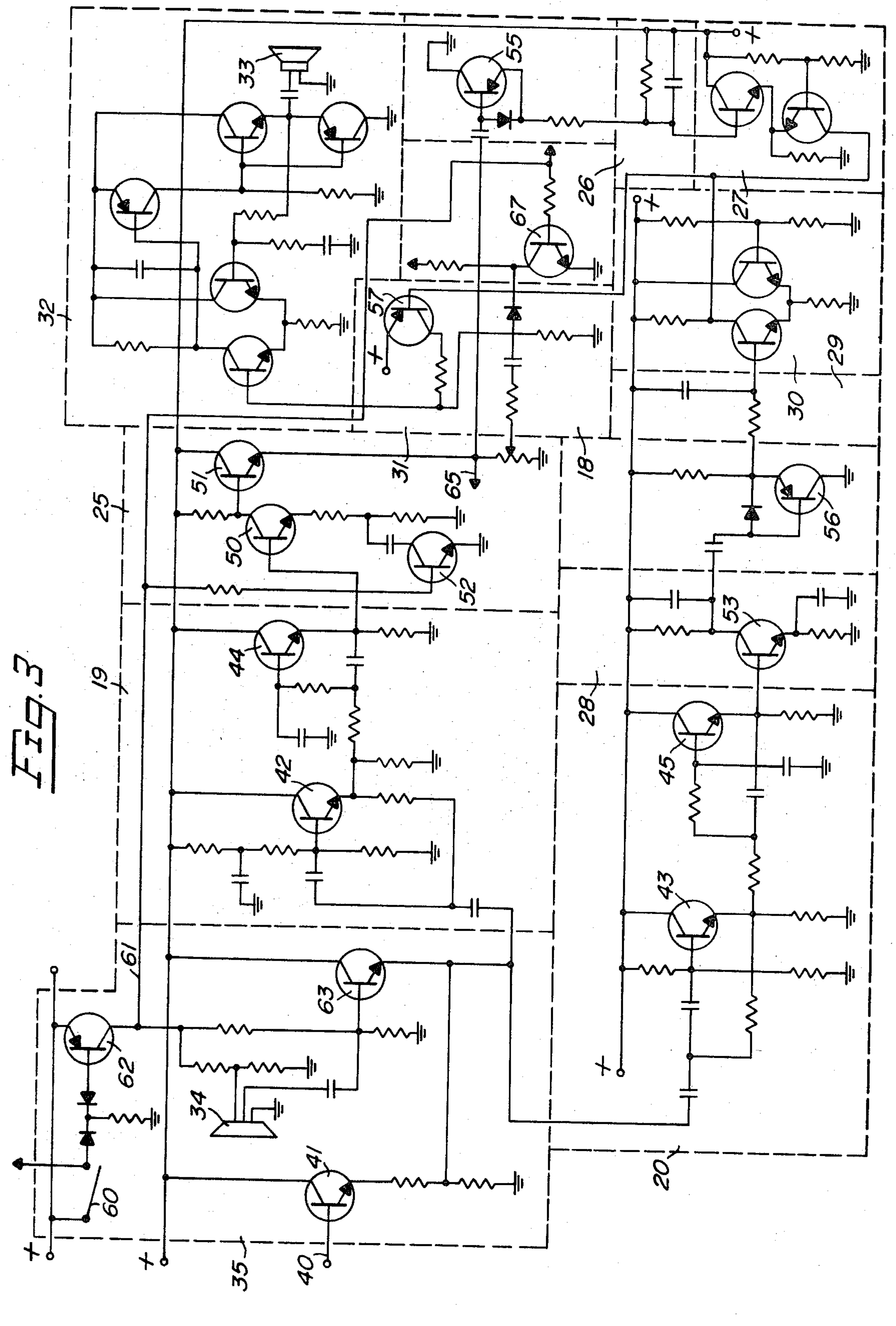
FIG. 3 is a schematic diagram of a portion of the system illustrated in FIG. 1.

Referring to FIG. 3, which illustrates schematically portions of the various apparatus described in conjunction with FIG. 1, information from the decoder 17 is applied to an input 40 of the amplifier and switch means 35. The input 40 is connected to the base of a transistor 41, forming the amplifier portion of the means 35, and the output thereof is connected (during the reception mode of operation) through suitable circuitry, to the bases of a transistor 42 in the first band pass filter 19 and a transistor 43 in the second band pass filter 20. Second transistors 44 and 45 in the filters 19 and 20, respectively, further process the signals and, if the signal received is correctly decoded, information from the filter 19 is applied to the amplifier 25, including three transistors 50, 51 and 52, and no information from the filter 20 is applied to the amplifier 28, including transistor 53. The output of the amplifier 25 is taken from the emitter of the transistor 51 and applied to a transistor 55, which operates as a voltage doubler. The output of the transistor 55 is applied through an RC integrator circuit 26 to the differential amplifier 27. The absence of signal at the transistor 53 of amplifier 28 is conveyed to a transistor 56, which operates as a voltage doubler, and applies a signal indicative of no voltage through an RC circuit, operating as integrator 29, to the differential amplifier 30. The output of the differential amplifier 27 and the inverse output of the differential amplifier 30 are applied to the base of a transistor 57, which operates as OR circuit 31. Transistor 57 and its associated circuitry (contained in block 18 in FIG. 3) conducts, upon the application of signals from either of the differential amplifiers 27 or 30, and applies information from the emitter of transistor 51 to the input of the audio output circuitry 32.

The combination of the integrator 26 and the bias on the differential amplifier 27 is such that signals at the output of the differential amplifier 27 caused by undecoded or improperly decoded signals will not have a sufficient amplitude to turn on the transistor 57 and supply a signal to the audio output 32. The average amplitude of the properly decoded signal (21 in FIG. 2) is substantially different, in the present embodiment greater, than the average amplitude of the improperly decoded signal, and is ample to turn on transistor 57 so that the information from the amplifier 25 is applied to the audio output 32. However, the inverse output of the differential amplifier 30 is connected to the transistor 57 so that only when no signal (or an insubstantial signal) is applied to the differential amplifier 30 is the output thereof sufficiently high to activate the transistor 57. Thus, the switch 18 is activated when a signal received by receiver 16 is properly decoded by decoder 17 to provide a sufficiently high level of information to the band pass filter 19 or, even in the absence of transmitted information (such as pauses between words or thoughts), to provide substantially no signal through the band pass filter 20 (making the inverse output of the differential amplifier 30 high).

In the transmit mode of operation, a push-to-talk switch 60 (in the amplifier and switch means 35) is opened to supply positive voltage to the scrambler of the coder 12 on a lead 61, to the base of transistor 52 to increase the gain of amplifier 25 and to the base of a transistor 67 to deactivate the switch 18 and prevent operation of the audio output 32. Switch 60 further supplies positive voltage to the base of a transistor 62. The transistor 62 supplies voltage to the microphone 34 and to the base of a transistor 63 which operates to supply information from the microphone 34 to the first band pass filter 19. The information is frequency limited by the band pass filter 19 (in the present embodiment to a band of frequencies between approximately 350 to 2,700 hertz) and supplied to the amplifier 25 where it is removed from the emitter circuit of the transistor 51 at a point designated 65. Point 65 is connected to the Delta modulator of the coder 12 where the information is converted to digital signals. Thus, the band pass filter 19 serves the dual function of frequency limiting transmitted information so that the information can be properly processed by a squelch circuit in a remote receiver and operating as a portion of the squelch circuit in the illustrated system.

No specific values have been assigned to the various components of the schematic diagram of FIG. 3 since the circuits are only representative of the various parts of the system and it should be understood that a large variety of well-known circuits might be utilized for the various parts. It should also be understood that a wide variety of uses, other than the transmit-receive system specifically illustrated, might incorporate the improved system, such uses including for example telephone systems and the like.

Thus, an improved squelch system is disclosed which automatically deactivates information utilization circuitry or the like for improperly decoded signals which are present on the basic frequency of the receiver. Further, the squelch system operates to activate the signal utilization circuitry throughout the reception of properly decoded signals, even during pauses therein. In addition to the above, the squelch system is utilized during transmission to frequency limit the information supplied to the transmitter so that squelch systems in remotely located receivers will operate properly. While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. A system, including a selective calling squelch circuit, for receiving transmitted signals including information, having a specified band of frequencies, coded to produce a relatively wide band of frequencies with an average amplitude across the band which differs substantially from the average amplitude across the band of the information, said system comprising:

a. receiver means adapted to receive said transmitted signals and supply an output of coded information;

b. a decoder coupled to said receiver means for receiving the output therefrom and decoding the coded information;

c. first switch means having an input, connected to receive the decoded information from said decoder, and an output;

d. first band pass filter means passing a band of frequencies lying within the specified band of frequencies of the information and having an input, connected to receive the output from said decoder, and an output;

e. second band pass filter means passing a relatively narrow band of frequencies coinciding with a portion of the band of frequencies of the coded information and excluding the band of frequencies of the information, said second filter means having an input, connected to receive the output from said decoder, and an output; and f. gate means connected to said first switch means and to the outputs of said first and second filter means for activating said first switch means to pass the information to the output thereof upon the occurrence of one of the passage of information through said first filter means and the absence of the passage of a signal through said second filter means.

2. A system as set forth in claim 1 including in addition first means interposed between said first filter means and said gate means and second means interposed between said second filter means and said gate means for converting signals passing therethrough to DC signals.

3. A system as set forth in claim 1 wherein the gate means includes an "OR" gate.

4. A system as set forth in claim 1 wherein the average amplitude of the information across the band thereof exceeds the average amplitude of the coded information across the band thereof and the gate means includes circuitry responsive to signals from the first filter means having an average amplitude across the band thereof which exceeds the average amplitude of the coded information across the band thereof by a predetermined amount.

5. A system as set forth in claim 1 wherein the band of frequencies of the coded information is approximately 0 to 30 KHz, the first filter means includes components tuned to pass a band of frequencies approximately 350 to 2,700 hertz and the second filter means includes components tuned to pass a band of frequencies approximately 50 to 150 hertz.

6. A system as set forth in claim 1 wherein the decoder includes a shift-register/exclusive-or curcuit and the coded information is a scrambled binary bit stream or digital signal.

7. A system as set forth in claim 1 including in addition:

transmitting means adapted to transmit signals including information, having the specified band of frequencies, coded to produce a relatively wide band of frequencies with an average amplitude across the band which differs substantially from the average amplitude across the band of the information;

coding means attached to said transmitting means for providing the coded information to be transmitted; and connecting means electrically attaching the first band pass filter means to said coding means for frequency limiting information applied to said coding means to the specified band of frequencies.

8. A system as set forth in claim 7 including in addition signal utilization means connected to the output of said first switch means.

9. A system as set forth in claim 8 including in addition a second switch means coupled to the transmitting means and the signal utilization means and including circuitry for deactivating said transmitting means during reception of signals and circuitry for deactivating said signal utilization means during transmission.

10. A transmit-receive system comprising:

a. receiving means adapted to receive transmitted signals including information, having a specified band of frequencies, coded to produce a relatively wide band of frequencies with an average amplitude across the band which differs substantially from the average amplitude across the band of the information;

b. a decoder coupled to said receiving means for receiving the output therefrom and decoding the coded information;

c. switch means having an input, connected to receive the decoded information from said decoder, and an output;

d. squelch means, including band pass filter means for passing a band of frequencies substantially equal to the specified band of frequencies of the information, connected to said decoder and to said switch means for activating said switch means to pass to the output of said switch means information received at the input of said switch means only when the information from said decoder is correctly decoded;

e. transmitting means adapted to transmit signals including information, having the specified band of frequencies, coded to produce a relatively wide band of frequencies with an average amplitude across the band which differs substantially from the average amplitude across the band of the information;

f. coding means attached to said transmitting means for providing the coded information to be transmitted; and g. switch means attached to said squelch means and said coding means for electrically connecting said band pass filter means to said coding means to frequency limit information applied to said coding means to the specified band of frequencies.

* * * * *